United States Patent
Winne

[15] 3,650,500
[45] Mar. 21, 1972

[54] EXTENSIBLE SUPPORT FOR WORK TRANSFER DEVICE

[72] Inventor: John R. Winne, Detroit, Mich.
[73] Assignee: Erie Engineering Company, Troy, Mich.
[22] Filed: Apr. 24, 1970
[21] Appl. No.: 31,524

[52] U.S. Cl..............................................248/125, 248/404
[51] Int. Cl.........................................................F16m 13/00
[58] Field of Search.....................248/124, 125, 404, 354 H; 254/93 H; 269/35; 108/20

[56] References Cited

UNITED STATES PATENTS

| 2,740,607 | 4/1956 | Branick | 254/93 H |
| 3,166,282 | 1/1965 | Nolan | 248/124 |
| 3,237,867 | 3/1966 | Hogg | 248/354 H X |
| 2,668,465 | 2/1954 | Kaufmann | 269/35 X |

Primary Examiner—William H. Schultz
Attorney—Barthel & Bugbee

[57] ABSTRACT

An extensible support is provided for the Lifting and Swinging Work Transfer Device of Kirsch et al. U.S. Pat. No. 3,406,837 of Oct. 22, 1968. This extensible support consists of a base adapted to be mounted near the machine to be served by the work transfer device. An external or auxiliary vertical fluid pressure cylinder mounted on this base contains a vertically-reciprocating reciprocating piston, the piston rod of which carries a cross-head connected to arms which in turn carry a horizontal platform on which the work transfer device is mounted. The auxiliary vertical fluid pressure cylinder, when supplied with pressure fluid, such as compressed air, raises the platform and with it the work transfer device, thereby supplementing and extending the range of lift possessed by the work transfer device itself.

2 Claims, 3 Drawing Figures

Patented March 21, 1972

INVENTOR
JOHN R. WINNE

BY Barthel & Bugbee

ATTORNEYS

INVENTOR
JOHN R. WINNE
BY Barthel & Bugbee
ATTORNEYS

EXTENSIBLE SUPPORT FOR WORK TRANSFER DEVICE

Figure 1:
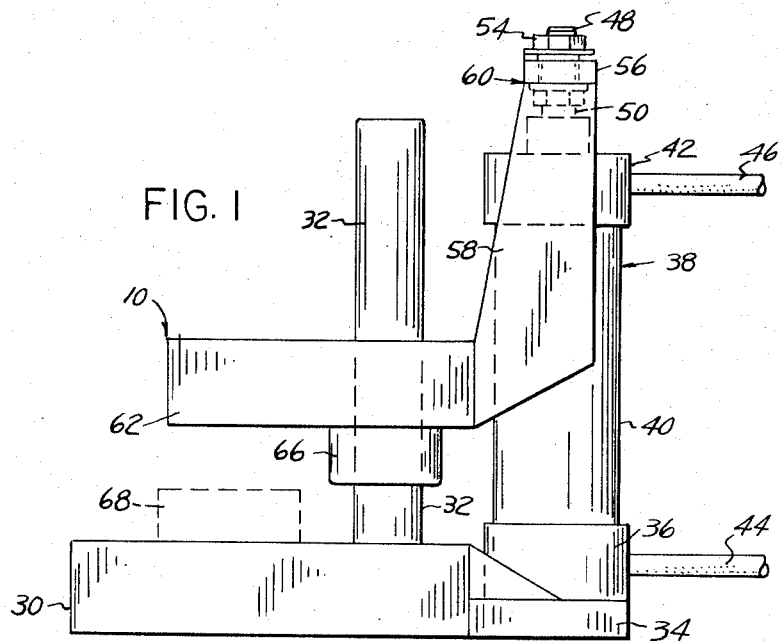
FIG. 1 is a side elevation of an extensible support for a work transfer device, according to one form of the invention.
Figure 2:
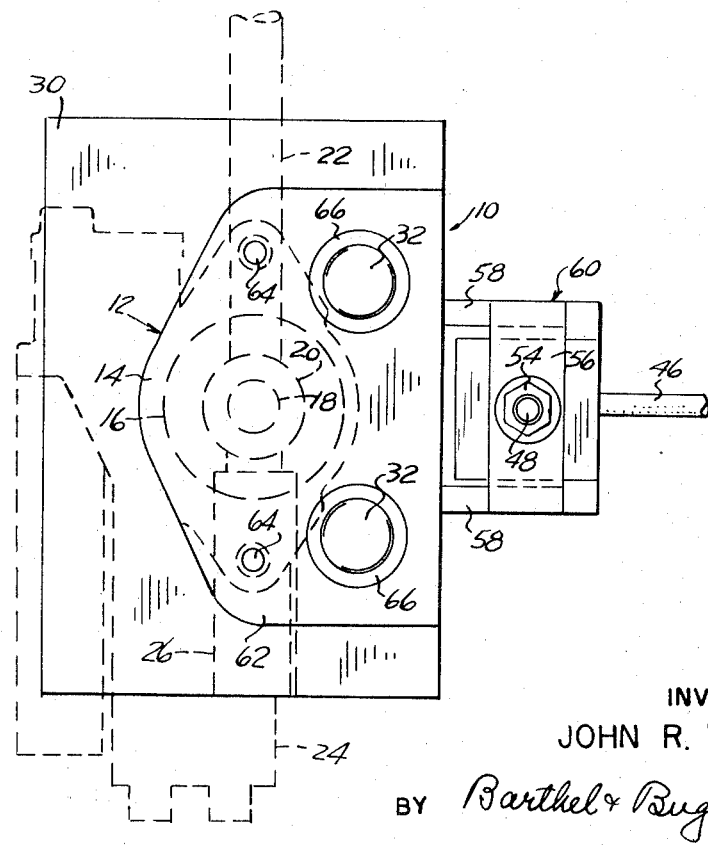
FIG. 2 is a top plan view of the extensible support shown in FIG. 1, with the work transfer device shown in dashed lines.
Figure 3:
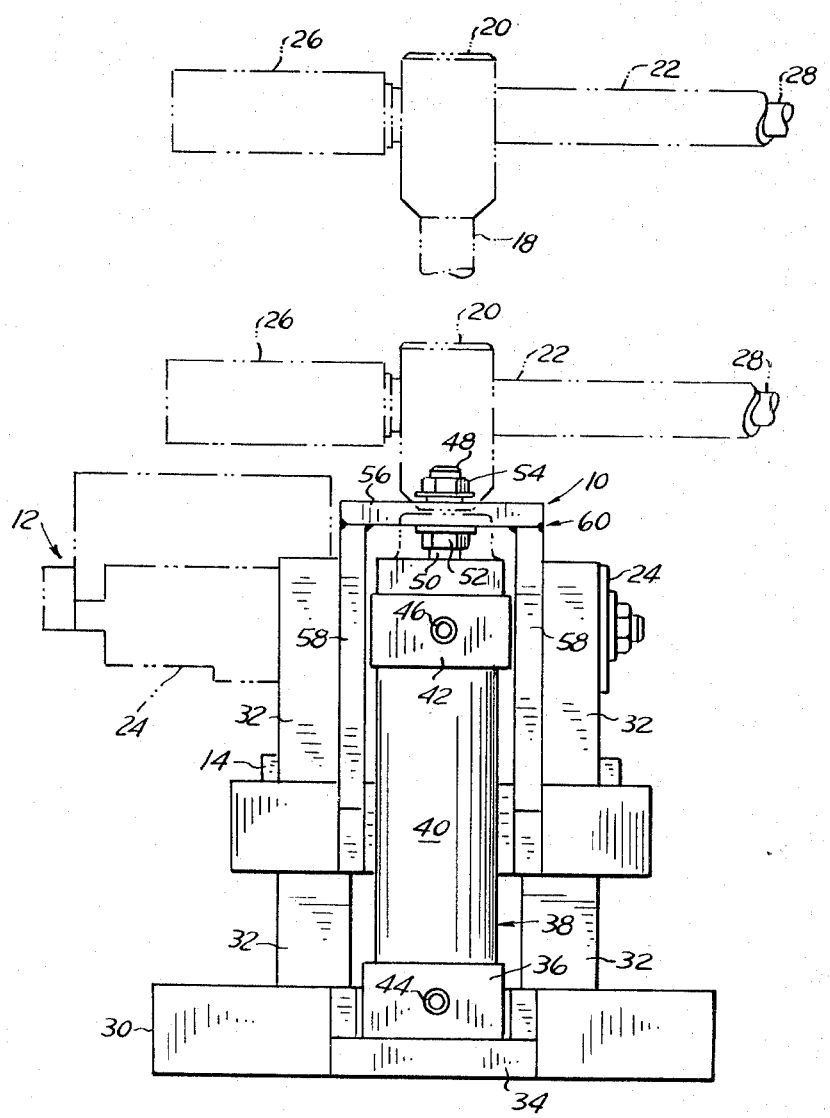
FIG. 3 is a right-hand side elevation of the extensible support shown in FIGS. 1 and 2, with the support in its lowered position in solid lines and with the work transfer device on the support platform shown in dashed lines in both its lowered and raised positions.

Referring to the drawings in detail, FIGS. 1, 2 and 3 show an extensible support, generally designated 10, according to one form of the invention as applied to a work transfer device 12 shown in dashed lines in FIGS. 2 and 3. The work transfer device 12 itself is beyond the scope of the present invention and is described and claimed in the Kirsch et al. U.S. Pat. No. 3,406,837 of Oct. 22, 1968 for Lifting and Swinging Work Transfer Device. Briefly described for a clearer understanding of the present invention, the illustrated embodiment of the work transfer device 12 of the above Kirsch et al. patent consists of a base 14 from which rises a vertical pneumatic cylinder 16 having a reciprocable piston rod 18 on the upper end of which is mounted a head 20 carrying a horizontal work transfer arm 22. The piston rod 18 is reciprocated vertically by the cylinder 16 and is rotated horizontally through a partial revolution by a horizontal fluid pressure cylinder 24 arranged perpendicularly to the piston rod 18 (FIGS. 2 and 3) and operatively connected thereto by suitable gearing (not shown). The arm 22 is tubular and at its forward end (not shown) carries a fixed work-gripping jaw (not shown). At its rearward end, the tubular arm 22 carries a fluid pressure jaw-operating cylinder 26 containing a piston (not shown), the piston rod 28 of which passes through the tubular arm 22 and on its forward end carries and moves a jaw (not shown) into and out of clamping engagement with the fixed jaw on the tubular arm 22 in response to the reciprocation of the piston rod 28 brought about by the operation of the fluid pressure jaw-operating cylinder 26.

Experience with the above-identified work transfer device of the Kirsch et al. U.S. Pat. No. 3,406,837 has shown that in some installations a greater range of lift is required than the range possible with the work transfer device cylinder 16 by itself. The present invention provides such an additional range of lift which extends the useful working height of the work transfer device 12.

The extensible support 10 of the present invention includes a base 30 which is bolted or otherwise secured in a suitable location adjacent the machine, such as 54 conventional forming press (not shown), served by the work transfer device 12. Mounted depending and rising from the base 30 are two spaced vertical parallel guide rods 32. Extending rearwardly from the base 30 is a base extension 34 upon which is mounted the lower cylinder head 36 of an auxiliary vertically disposed reciprocatory fluid pressure motor, generally designated 38, having a cylinder 40 closed at its lower end by the lower cylinder head 36 and at its upper end by an upper cylinder head 42. The cylinder heads 36 and 42 are bored horizontally for the connection of lower and upper fluid service pipes or conduits 44 and 46 respectively.

Threaded upon the threaded upper end portion 48 of the piston rod 50 of the auxiliary fluid pressure motor 38 are two spaced clamping nuts 52 and 54 which serve to clamp between them a cross head 56 which, with two depending parallel arms 58 welded or otherwise secured thereto at their upper ends, collectively constitute a bracket 60. Welded or otherwise secured to the lower ends of the arms 58 is a platform 62 to which the work transfer device base 14 is bolted as at 64. The platform 62 is bored vertically at laterally spaced locations to receive a pair of bearing bushings 66 of suitable bearing material, such as bronze, which slidable engage and receive vertical guidance from the vertical guide rods 32. From FIG. 1 it will be seen that the arms 58 are inclined downward and forward from their connections with the cross head 56 to their connections with the platform 62, which is thus disposed in cantilever relationship to the cross head 56 by the arms 58. It will also be seen from FIGS. 1 and 2 that the bearing bushings 66 assist the arms 58 in providing support for the cantilever platform 62 by preventing sagging or bending thereof during operation. A pressure fluid manifold 68, indicated by dashed lines in FIG. 1, is preferably mounted on the base 30 and connected to a source of pressure fluid and by way of and to the work transfer device 12 and pipes 44 and 46.

Prior to the operation of the invention, let it be assumed that the work transfer device 12 has been secured, as by the bolts 64, to the platform 62, which is suitably drilled and threaded for that purpose, and that both the work transfer device 12 and the auxiliary vertical fluid pressure motor 38 have been connected, through suitable valves, to a source of pressure fluid, such as compressed air. Let it also be assumed that the vertical range required for transferring the workpiece is beyond the range of the work transfer device 12 without the added assistance of the extensible support 10. Let it also be assumed that the conditions of operation require that the workpiece be lifted from a machine, such as a forming press, in which a workpiece is formed between dies from sheet metal or plastic material, swung horizontally through an arcuate path, lowered to a point of disposal, and there discharged, after which the work transfer device 12 is returned to its starting position.

In accordance with the cycle of operation just mentioned, pressure fluid is admitted through the pipe 44 and discharged through the pipe 46, causing the piston rod 50 to move upward, carrying with it the bracket 60, platform 62 and work transfer device 12, which thereupon through its own mode of operation described in the above-identified Kirsch et al. U.S. Pat. No. 3,406,837 causes its own piston rod 18 to rise still further, and then to be rotated by the horizontal cylinder 24 and its associated mechanism to swing the arm 22 into a work pickup position relatively to the machine being served. Assuming the work-gripping jaws on the tubular arm 22 and jaw-operating rod 28 to be in their open position, the work transfer device 12 then causes its piston rod 18 to descend until the work-gripping jaws arrive adjacent the workpiece to be transferred, aided, if necessary, by a descent of the platform 62 brought about by a reversal of the vertical hydraulic motor 38 effecting descent of the piston rod 50 and bracket 60.

The subsequent operation of the jaw-operating cylinder 26 causes the workpiece to be gripped by and between the jaws on the arm 22 and piston rod 28 respectively, whereupon the work transfer device 12 is supplied with pressure fluid in a direction causing the piston rod 18 thereof to rise, carrying with it the arm 22 and rod 28 whose jaws are gripping the workpiece being transferred, aided by the vertical motion of the piston rod 50 and bracket 60 brought about by the operation of the auxiliary fluid pressure motor 38. The mechanism within the work transfer device 12 in response to the operation of the horizontal fluid pressure cylinder 24 and its associated mechanism, then causes rotation of the piston rod 18 to swing the arm 22 and workpiece carried by the jaws thereof through an arcuate horizontal path to a location above the point of disposal of the workpiece, such as to another machine, a conveyor, or a tote-box.

The cylinder 16 of the work transfer device 12, aided by the auxiliary fluid pressure motor 38, then causes descent of the piston rods 18 and 50 to lower the arm 22 and the workpiece carried thereby to the point of disposal, whereupon reverse operation of the jaw-operating cylinder 26 moves the piston rod 28 thereof to separate the work-gripping jaws and drop the workpiece. The work transfer device 12 and the auxiliary reciprocatory motor 38 are then caused to operate their respective piston rods 18 and 50 to raise the arm 22 relatively to the cylinder 16 and at the same time raise the work transfer device 12 bodily on the platform 62, whereupon the horizontal cylinder 24 of the workpiece transfer device 12 is then actuated to swing the arm 22 back to its starting position. This completes the cycle of operation, unless it is desired to lower the arm 22 to its original starting position, rather than swing back on the higher level to the machine being served, in which case the auxiliary motor 38 and the work transfer device 12 are operated simultaneously to cause a simultaneous descent of the piston rods 18 and 50, returning the work-carrying arm 22 to the lower level of its starting position.

I claim:

1. An extensible support for a work transfer device, comprising a base structure, an auxiliary fluid pressure cylinder mounted in a vertical position on said base structure near one edge thereof, a piston mounted for vertical reciprocation in said auxiliary cylinder and having a piston rod extending externally from one end thereof, a bracket connected to said piston rod in laterally-offset relationship thereto, a substantially horizontal platform connected to said bracket in cantilever relationship therewith and extending laterally from said bracket over said base, upstanding guide means mounted on said base in vertical guiding relationship with said platform and including a plurality of vertical guide members mounted on said base in spaced parallel relationship to said piston rod and to each other, and means for supplying pressure fluid to and discharging fluid from said auxiliary cylinder, said platform being provided with a plurality of laterally spaced bearing elements disposed in relatively sliding relationship to said guide members.

2. An extensible support for a work transfer device, according to claim 4, wherein said bearing elements are disposed in laterally spaced relationship to the points of connection of said bracket to said platform.

* * * * *